June 24, 1947. W. A. SCHULZE ET AL 2,422,859
PRODUCTION OF NITRILES OF UNSATURATED ACIDS
Filed May 4, 1944
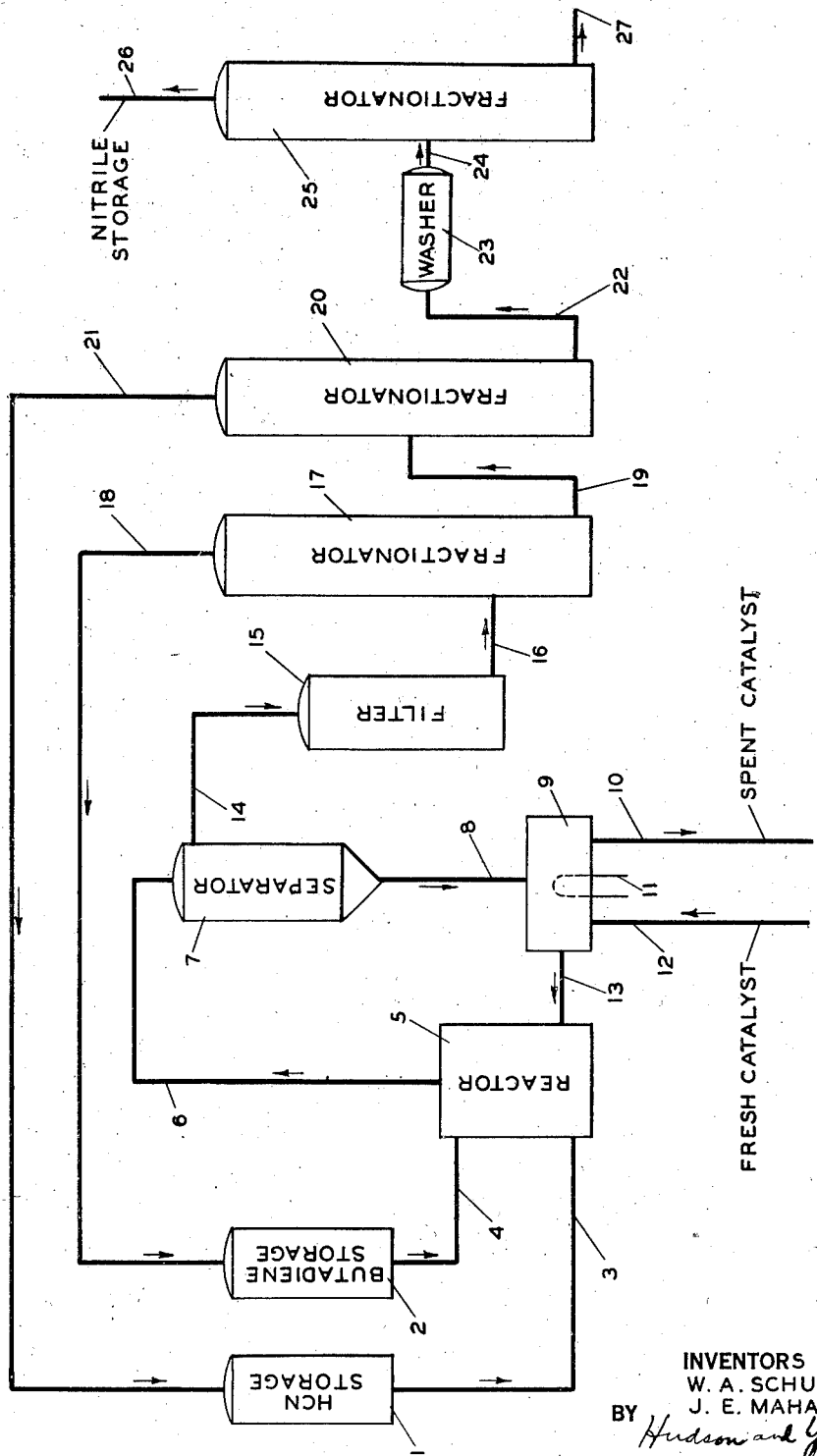
INVENTORS
W. A. SCHULZE
J. E. MAHAN
BY Hudson and Young
ATTORNEYS Patented June 24, 1947

2,422,859

UNITED STATES PATENT OFFICE 2,422,859

PRODUCTION OF NITRILES OF UNSATURATED ACIDS

Walter A. Schulze and John E. Mahan, Bartlesville, Okla., assignors to Phillips Petroleum Company, a corporation of Delaware Application May 4, 1944, Serial No. 534,161

10 Claims. (Cl. 260—464)

This invention relates to the production of organic cyanides or nitriles of organic acids by the novel addition of hydrocyanic acid or hydrogen cyanide to conjugated diolefins. More specifically, the present invention relates to the manufacture of nitriles of unsaturated organic acids by interaction of diolefins having a conjugated double bond with hydrocyanic acid or hydrogen cyanide in the presence of a catalyst comprising cuprous chloride in an aqueous medium. Still more specifically, the invention pertains to the manufacture of alkenyl and cycyloalkenyl cyanides or nitriles of unsaturated aliphatic and cycloaliphatic carboxylic acids having at least four carbon atoms per molecule, exclusive of the cyanide radical.

Organic cyanides or nitriles have long been known as versatile intermediates in organic synthesis by virtue of the hydrolytic, hydrogenation and condensation reactions which they undergo and which lead to the formation of acids, amines, imines, aldehydes, ketones and the like. More recently, the development of the synthetic-resin and synthetic-rubber industry has created a demand for nitriles of unsaturated organic acids or unsaturated nitriles for use as co-monomers. In addition to this latter use, the ready availability of unsaturated nitriles renders possible the synthesis of a variety of unsaturated compounds such as unsaturated acids. Furthermore, unsaturated nitriles can be employed in reactions involving saturated nitriles by the simple expedient of hydrogenating the end-product.

Prior to the present discovery, the synthesis of unsaturated nitriles has been possible only by expensive and, for the most part, inefficient reactions. The most commonly employed synthesis involves the interaction of an alkenyl halide with a metal cyanide. This reaction, however, fails when a double bond is present in the position alpha to the cyanide group. Other operative methods of preparing alkenyl nitriles may be deduced from classical reactions used in preparing saturated nitriles, such as, for example, the dehydration of unsaturated amides. Thus, certain unsaturated nitriles containing four or more carbon atoms in the alkenyl radical have been prepared by heating the corresponding acid with ammonia over a quartz catalyst at approximately 935° F. It can be seen, however, that such methods of synthesis have well-defined limitations imposed by the availability of the starting acid.

It is an object of the present invention to provide a simple and direct process for the manufacture of unsaturated nitriles having four or more carbon atoms in the unsaturated hydrocarbon radical.

Another object of this invention is to provide a process for effecting the direct addition of hydrogen cyanide to aliphatic and cyclic conjugated diolefins in the presence of an aqueous cuprous chloride solution under relatively moderate conditions of temperature and pressure.

A further object is the provision of a continuous process for the synthesis of unsaturated nitriles from conjugated diolefins and hydrogen cyanide.

A still further object of the invention is to provide a process for the manufacture of unsaturated nitriles having four or more carbon atoms which are of exceptional value as intermediates for use in chemical syntheses.

Further objects of the invention, some of which are referred to hereinafter, will be apparent to those skilled in the art to which the invention pertains.

We have found that unsaturated nitriles can be conveniently and easily prepared by the direct interaction of a conjugated diolefin and hydrogen cyanide in the presence of an aqueous cuprous chloride catalyst. The direct addition of hydrogen cyanide to conjugated diolefins, either catalytically or non-catalytically, has not heretofore been known to the art. The following equation, in which butadiene, the simplest conjugated diolefin, is used as an example, illustrates this new type of reaction:

$$CH_2=CH-CH=CH_2 + HCN \rightarrow$$
1,3-butadiene

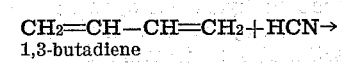
3-pentenenitrile

While in many instances 1,4 addition of hydrogen cyanide to the conjugated diolefin is the predominant reaction, it is not intended that the present invention should be limited to this specific mechanism, since in some instances the addition may follow a different course.

The present novel nitrile synthesis is accomplished by bringing controlled proportions of the selected conjugated diolefin or diene and hydrogen cyanide into intimate contact with an aqueous solution of cuprous chloride containing inorganic salts or acids to increase the solubility of the cuprous chloride. The reaction may be carried out as a batch reaction, wherein the diene is passed into an agitated dispersion or solution of hydrogen cyanide in the aqueous catalyst phase, or a continuous process may be employed with the reactants passing through a contact zone containing the catalyst solution. The nitrile formation proceeds satisfactorily on commingling the gaseous reactants with the catalyst; however, in most instances, liquid-liquid contact is preferred.

In the accompanying drawing, which is a simplified flow-diagram, is illustrated a specific embodiment of a continuous process of the present invention for producing pentenenitrile (butenyl cyanide or propenylacetonitrile). Substantially pure liquid hydrocyanic acid or hydrogen cyanide in storage tank 1 and liquid butadiene in tank 2 are charged via their respective transfer conduits or lines 3 and 4 to the reactor or reaction zone 5. The said reactor 5 contains a catalyst consisting of cuprous chloride dissolved in an aqueous ammonium chloride solution. Sufficient pressure is maintained in the reactor 5 in order to insure liquid-phase conditions and adequate means of a conventional nature are provided therein to maintain a state of intimate dispersion of reactants and catalyst. The temperature of reactor 5 is maintained at about 190° to 210° F. The effluent from reaction zone 5, which consists of an emulsion of the product nitrile and unreacted hydrogen cyanide and butadiene in the aqueous catalyst phase, is discharged through conduit or line 6 to separation zone 7 where the aqueous phase settles out by virtue of its higher specific gravity. The aqueous phase is continuously removed through line 8 to tank 9, which is maintained at reaction temperature, by means of steam coils 11, in order to prevent the precipitation of cuprous chloride. The catalyst solution may be either continuously or intermittently withdrawn through line 10 for regenerative treatment. The catalyst volume and activity are maintained at a constant level by the addition of fresh or regenerated catalyst to tank 9, line 13, or directly to reactor 5. Cuprous chloride solutions from tank 9 are returned to the reaction zone 5 via line 13.

The nitrile product stream is continuously withdrawn from the separator 7 by means of line 14, which in turn discharges into filter 15, where traces of entrained catalyst phase are removed. The filter may be of conventional design containing felt plates or it may be filled with a suitable adsorbent clay. The substantially dry product stream is then transferred via line 16 to fractionator 17, where unreacted butadiene is taken overhead through line 18 to storage tank 2. The kettle product is discharged via line 19 into fractionator 20 and unreacted hydrogen cyanide is conducted by line 21 to storage tank 1. The kettle product from fractionator 20 is ordinarily of sufficient purity for direct use; however, in order to prepare a product of high purity, the crude nitrile is transferred via line 22 to washer 23, where the last traces of hydrogen cyanide and other acidic constituents are removed by washing with an aqueous sodium hydroxide solution. The washed material is then transferred through line 24 to fractionator 25, in which pure pentenenitrile is taken overhead by way of line 26. Small quantities of polymeric high-boiling material which is formed as a by-product may be removed from fractionator 25 through line 27.

It is obvious that when higher-boiling dienes such as piperylene (1,3-pentadiene), isoprene (2-methyl-1,3-butadiene), and cyclopentadiene are employed, the lower-boiling hydrogen cyanide would be removed in the initial fractionation, rather than in the second fractionation as shown in the diagram.

The catalyst for use in the process of the present invention consists essentially of an aqueous acid solution of cuprous copper ions ($Cu^+$). Inorganic reagents such as ammonium chloride and alkali-metal chlorides such as sodium chloride are employed, with or without hydrochloric acid, to increase the solubility of cuprous chloride and thereby increase the efficiency of the catalyst. Since cupric copper is not a catalyst for the present nitrile synthesis, and since its presence gives rise to undesirable side reactions, such as the production of cyanogen from hydrogen cyanide, a reducing agent is ordinarily incorporated into the catalyst solution to maintain the dissolved copper in the cuprous state. Reducing agents for this purpose include copper powder, sulfur dioxide, sodium bisulfite, hydroxylamine, hydrazines and the like. In selecting the reducing agent, preference is given to those materials which do not themselves react with the diolefin or hydrogen cyanides. The reducing agent is generally used in an amount just sufficient to reduce all cupric copper to cuprous copper but it may be used in excess of this amount when it is copper powder or a substance which does not itself react substantially with the diolefin or hydrogen cyanide. A typical catalyst solution is prepared by agitating 1 part of cuprous chloride with 1.4 parts of water containing from 0.4 to 0.9 part of ammonium chloride. A small proportion of hydrochloric acid and a small proportion of copper powder is added to the solution to prevent oxidation of the dissolved cuprous copper.

Although cuprous chloride is the most readily available cuprous salt, the solution may be prepared directly from cuprous chloride resulting from the reaction of copper metal and hydrochloric acid, or by the use of other cuprous salts, such as cuprous cyanide, which are soluble to a sufficient extent in the corresponding acids or in solutions of ammonium or alkali-metal salts of the acid. Neutral or slightly acid solutions rather than ammoniacal solutions of the cuprous salts are preferred as catalysts for use in the process of the present invention.

The conjugated diolefins which may be used in the process of the present invention are 1,3-butadiene and its homologs, as well as conjugated cyclic diolefins such as 1,3-cyclopentadiene, 1,3-cyclohexadiene and their respective homologs. Piperylene (1,3-pentadiene) and isoprene (2-methyl-1,3-butadiene) are particularly contemplated. These dienes may be derived from any convenient source, such as by thermal and catalytic cracking of petroleum gases and distillates and thermal decomposition of rubber. While relatively pure diolefins are ordinarily preferred, it is often advantageous to carry out the reaction with mixtures of dienes with subsequent purification of the resulting unsaturated nitriles. Inert diluents such as n-butane and other saturated hydrocarbons may be employed in admixture with the diolefin in order to suppress or reduce the formation of extraneous polymerization products.

Reaction temperatures are ordinarily maintained at a level selected to give an adequate reaction rate with minimum hydrolysis of the product nitrile. Depending on the charging rate of the conjugated diolefin, reaction temperatures may vary from approximately 100° F. to approximately 500° F., with a preferred intermediate range of about 150° to 250° F. being most generally desirable.

Reaction pressures are largely governed by the mode of operation and may extend from atmospheric pressure to about 500 pounds per square inch or higher. If the reaction is carried out by contacting the vaporized diene and vaporized hydrogen cyanide with the catalyst, then atmospheric or low superatmospheric pressures may be used. However, when complete liquid-phase operation is desired, sufficient pressure is generally employed to maintain the reactants in a liquefied condition at the temperature of reaction. In the case of the interaction of butadiene with hydrogen cyanide, pressures of 300 to 400 pounds per square inch are adequate to provide complete liquid-phase operation at temperatures within the range of approximately 150° to approximately 200° F.

Although the present process may be successfully operated with equimolecular proportions of conjugated diene and hydrogen cyanide, it is ordinarily preferred to have a molecular excess of one of the reactants in order to take advantage of the mass-action law. Provided that the polymerization characteristics of the diolefin do not contraindicate the employment of excess diene, the process is ordinarily carried out with a molecular ratio of diolefin to hydrogen cyanide of 2:1 or higher. This mode of operation insures virtually complete reaction of the hydrogen cyanide and obviates the possible hazard involved in its recovery. However, in the case of easily polymerized dienes, such as cyclopentadiene, it is generally expedient to operate with the hydrogen cyanide in molecular excess.

The time or period of contact between catalyst and reactants is subject to rather wide variation and is dependent on the temperature, activity of the catalyst and the nature of the conjugated diolefin. Excessive contact times are undesirable due to the concomitant tendency toward hydrolysis of the nitrile. Ordinarily a reaction time of about 10 to 30 minutes is ample, although, in special cases involving low reaction temperatures, longer contact periods may be necessary. On the other hand, with a highly reactive diolefin, reaction times of less than 10 minutes may be indicated. In actual operation of the process this variable is regulated by frequent analyses for free hydrogen cyanide, which may be used as a convenient index of the extent of conversion.

In order to further illustrate the process of the present invention, the following examples are referred to. However, since numerous other process modifications will be obvious in the light of the foregoing disclosure, no undue limitations are intended.

Example 1

The production of a pentenenitrile consisting mainly of 3-pentenenitrile was effected by passing gaseous butadiene and hydrogen cyanide gas through an aqueous solution of cuprous chloride having the following composition: 500 grams cuprous chloride, 250 grams ammonium chloride, 30 grams copper powder, 15 milliliters concentrated hydrochloric acid and 1200 milliliters water. The catalyst solution was agitated and heated to 200° to 210° F. and the butadiene and hydrogen cyanide in equimolecular proportions were passed into the catalyst solution at a rate equivalent to approximately 0.67 mol of each reactant per hour. The reactor effluent, comprising the nitrile, hydrogen cyanide, butadiene and some water vapor, was condensed for subsequent purification. The condensate was washed with a 30 per cent aqueous sodium hydroxide solution, dried over calcium chloride and distilled. The nitrile had a distilling range of 282° to 288° F. The yield of pentenenitrile was found to average 21 weight per cent of the theoretical during a reaction period of 40 hours.

A sample of the above nitrile was hydrolyzed with sodium hydroxide solution and the resulting saturated acid was recovered. The melting point of the p-bromophenacyl ester of the recovered acid was found to be 86–87° C., which is that reported for the same ester of n-3-pentenoic acid. The identity of the nitrile was further substantiated by its reduction to 1-aminopentane (n-pentylamine).

Example 2

A brass-lined pressure reactor of approximately 600-milliliters capacity equipped with an agitator of the turbo-mixer type and a catalyst separator was employed in this example. The catalyst solution described in Example 1 was charged to the reactor and the hydrogen cyanide and butadiene were metered to the reactor under a pressure of approximately 250 pounds per square inch gage. The rate of flow from the reactor was controlled by an effluent valve on the catalyst separator. The aqueous catalyst phase was continuously recirculated to the reactor from the separator by means of the combined effects of gravity and the action of the turbo-mixer. The effluent was fractionated to remove excess hydrogen cyanide and unreacted butadiene. The resulting nitrile was washed with sodium hydroxide solution, dried and fractionally distilled to prepare a product consisting essentially of 3-pentenenitrile. Reaction conditions are summarized in the following tabulation:

| | |
|---|---|
| Catalyst solution, ml | 300 |
| HCN/butadiene, mol ratio in feed | 2:1 |
| Effluent flow-rate, ml./hr | 900 |
| Contact time, minutes | 30 |
| Reaction temperature, °F | 210 |
| Reactor pressure, p. s. i | 250 |

A substantial yield of 3-pentenenitrile was obtained.

Example 3

The reaction procedure described in Example 2 was employed in reacting isoprene with hydrogen cyanide. The feed to the reactor comprised substantially pure hydrogen cyanide and an isoprene concentrate containing about 70 per cent isoprene and 30 per cent of olefinic material. The hydrogen cyanide-isoprene mol ratio of 2:1 was based on the pure isoprene content of the feed stock. The reactor effluent was fractionated to remove hydrogen cyanide and the non-reactive olefinic material. The crude product was washed with dilute sodium hydroxide solution to remove traces of hydrogen cyanide and then fractionally distilled. A fraction having a boiling range of 300° to 340° F. constituted about 90 per cent of the crude product. Hydrolysis of the product fraction indicated that it consisted of a mixture of isomeric hexenenitriles.

Example 4

The catalyst solution and general procedure described in Example 1 were employed to effect the interaction of 1,3-cyclopentadiene and hydrogen cyanide to prepare cyclopentenylcyanide. Approximately 650 milliliters of catalyst solution was charged to a one-liter flask equipped with a mechanical stirrer and means for maintaining the temperature of reactants at 200° to 205° F. This reaction flask was connected to an ice-cooled condenser and a receiver. Cyclopentadiene admixed with an equal volume of n-butane diluent was passed into the solution simultaneously with gaseous hydrogen cyanide at such rates that a molecular ratio of hydrogen cyanide to diene of substantially 1.5:1 was maintained. The charging rate of cyclopentadiene amounted to approximately 0.5 mol per hour. The combined effects of temperature, steam and inert gas served to carry the product nitrile out of the reaction flask into the ice-cooled condenser, where the product and unreacted hydrogen cyanide were condensed. The hydrogen cyanide was removed from the product by distillation to yield crude nitrile contaminated with some cyclopentadiene polymer. Fractional distillation of the crude product yielded a fraction having a distilling range of 320° to 335° F., in an amount equal to 30 weight per cent of the theoretical calculated for the direct addition of hydrogen cyanide to the cyclopentadiene charged. Acid hydrolysis of the product fraction resulted in the production of a carboxylic acid. Absorption of bromine by the product indicated that the major proportion of the product fraction was $\Delta^2$-cyclopentenyl cyanide. The boiling range of the fraction at 15 mm. of mercury was 150° to 160° F.

Obviously many modifications and variations of the invention as hereinbefore set forth may be made without departing from the scope thereof and therefore no limitations are to be imposed thereupon except as specified in the appended claims.

Our copending application, Ser. No. 534,162, filed of even date herewith, discloses and claims the preparation of unsaturated nitriles by the direct addition of hydrogen cyanide to conjugated diolefins in vapor phase in the presence of a solid catalyst comprising a cuprous salt, particularly cuprous chloride. The instant application is directed generically to the manufacture of unsaturated nitriles by the direct addition of hydrogen cyanide to conjugated diolefins by means of cuprous salts and specifically to such manufacture where the cuprous salt is in the form of an aqueous solution.

We claim:

1. A process for the production of a nitrile of an unsaturated carboxylic acid which comprises the reaction of hydrogen cyanide and a conjugated diolefin selected from the group consisting of aliphatic and cycloaliphatic diolefin hydrocarbons in the presence of an aqueous slightly acidic solution of cuprous chloride containing a solubilizing salt selected from the group consisting of ammonium and alkali-metal chlorides at a temperature between 100° and 500° F. and under pressure sufficient to maintain complete liquid phase conditions.

2. A process for the production of a nitrile of an unsaturated carboxylic acid which comprises the reaction of hydrogen cyanide and a conjugated diolefin selected from the group consisting of aliphatic and cycloaliphatic diolefin hydrocarbons in the presence of an aqueous slightly acidic solution containing cuprous ions and a solubilizing agent selected from the group composed of the chlorides of ammonium and the alkali metals at a temperature within the range of approximately 100° to approximately 500° F. and under pressure sufficient to maintain complete liquid phase conditions.

3. A process for the production of an alkenenitrile which comprises the reaction of hydrogen cyanide and a conjugated aliphatic diolefin hydrocarbon in the presence of an aqueous slightly acid solution containing cuprous ions and a solubilizing agent selected from the group composed of the chlorides of ammonium and the alkali metals at a temperature within the range of approximately 100° to approximately 500° F. and under pressure sufficient to maintain complete liquid phase conditions.

4. A process for the production of a cycloalkenyl cyanide which comprises the reaction of hydrogen cyanide and a conjugated cycloaliphatic diolefin hydrocarbon in the presence of an aqueous slightly acid solution containing cuprous ions and a solubilizing agent selected from the group composed of the chlorides of ammonium and the alkali metals at a temperature within the range of approximately 100° to approximately 500° F. and under pressure sufficient to maintain complete liquid phase conditions.

5. A process for the production of a n-pentenenitrile which comprises the reaction of 1,3-butadiene and hydrogen cyanide in the presence of an aqueous slightly acidic solution of cuprous chloride containing a solubilizing salt selected from the group consisting of ammonium and alkali-metal chlorides at a temperature within the range of approximately 150° to approximately 250° F. and under pressure sufficient to maintain complete liquid phase conditions.

6. A process for the production of a hexenenitrile which comprises the reaction of an aliphatic conjugated pentadiene and hydrogen cyanide in the presence of an aqueous slightly acidic solution of cuprous chloride containing a solubilizing salt selected from the group consisting of ammonium and alkali-metal chlorides at a temperature within the range of approximately 150° to approximately 250° F. and under pressure sufficient to maintain complete liquid phase conditions.

7. A process for the production of a cyclopentyl cyanide which comprises the reaction of 1,3-cyclopentadiene and hydrogen cyanide in the presence of an aqueous slightly acidic solution of cuprous chloride containing a solubilizing salt selected from the group consisting of ammonium and alkali-metal chlorides at a temperature within the range of approximately 150° to approximately 250° F. and under pressure sufficient to maintain complete liquid phase conditions.

8. A continuous process for the production of a n-pentenenitrile which comprises continuously passing a mixture of hydrogen cyanide and 1,3-butadiene in the molecular ratio of approximately 2:1 into contact with an aqueous slightly acidic solution of cuprous chloride containing a solubilizing salt selected from the group consisting of ammonium and alkali-metal chlorides at a temperature within the range of approximately 150° to approximately 250° F. and at a pressure within the range of approximately atmospheric to approximately 500 pounds per square inch and sufficient to maintain complete liquid phase conditions, continuously withdrawing the product nitrile and separating said product nitrile from unconverted reactants associated therewith, returning the unconverted reactants to the aqueous cuprous chloride solution, and continuously regenerating said cuprous chloride solution.

9. A method of manufacturing 3-pentenenitrile which comprises continuously contacting substantially pure liquid hydrogen cyanide and 1,3-butadiene with a catalyst consisting essentially of cuprous chloride dissolved in an aqueous ammonium chloride solution under pressure sufficient to maintain complete liquid phase conditions, effecting an intimate dispersion of the reactants and catalyst in the reaction zone, maintaining the reaction zone at a temperature of about 210° F., employing a contact time of about 30 minutes and a molecular ratio of hydrogen cyanide to butadiene in the feed of about 2:1, continuously withdrawing the reaction mixture consisting of an emulsion of the product 3-pentenenitrile and unreacted hydrogen cyanide and butadiene in the aqueous catalyst phase and allowing same to continuously stratify into an aqueous catalyst phase and a nitrile-containing phase, recirculating said aqueous catalyst phase to the reaction zone, and recovering the product 3-pentenenitrile from said nitrile-containing phase.

10. The method of claim 9 wherein said catalyst contains small proportions of hydrochloric acid and of metallic copper which acts as a reducing agent and maintains the dissolved copper in the cuprous state.

WALTER A. SCHULZE.
JOHN E. MAHAN.

REFERENCES CITED

The following references are of record in the file of this patent:

UNITED STATES PATENTS

| Number | Name | Date |
| --- | --- | --- |
| 2,322,696 | Kurtz et al. | June 22, 1943 |
| 2,102,611 | Carothers et al. | Dec. 21, 1937 |
| 2,123,504 | Dykstra | July 12, 1938 |

OTHER REFERENCES

Kharasch et al., J. Org. Chem., vol. 2, pp. 489–96 (1937). (Copy in Scientific Lib.)